United States Patent
Lin (10) Patent No.: US 8,081,224 B2
(45) Date of Patent: Dec. 20, 2011

(54) METHOD AND APPARATUS FOR IMAGE STABILIZATION USING MULTIPLE IMAGE CAPTURES

(75) Inventor: Peng Lin, Pleasanton, CA (US)

(73) Assignee: Aptina Imaging Corporation, George Town (KY)

( * ) Notice: Subject to any disclaimer, the term of this patent is extended or adjusted under 35 U.S.C. 154(b) by 896 days.

(21) Appl. No.: 12/149,723

(22) Filed: May 7, 2008

(65) Prior Publication Data

US 2009/0278945 A1    Nov. 12, 2009

(51) Int. Cl.
 *H04N 5/228* (2006.01)
 *H04N 5/235* (2006.01)
 *H04N 5/262* (2006.01)
 *G06K 9/40* (2006.01)

(52) U.S. Cl. ............. 348/208.99; 348/208.1; 348/208.4; 348/208.12; 348/239; 348/362; 348/241; 382/260

(58) Field of Classification Search ............... 348/208.1, 348/208.4, 208.12, 208.13, 208.99, 241, 348/218.1, 239, 362, 229.1, 221.1; 382/254, 382/260; 375/240.16
See application file for complete search history.

(56) References Cited

U.S. PATENT DOCUMENTS

| | | | |
|---|---|---|---|
| 5,629,988 A | 5/1997 | Burt et al. | |
| 6,317,114 B1 | 11/2001 | Abali et al. | |
| 7,254,279 B2 | 8/2007 | Chen | |
| 7,295,232 B2 * | 11/2007 | Washisu | 348/239 |
| 7,315,325 B2 | 1/2008 | Souplíotis et al. | |
| 7,489,829 B2 * | 2/2009 | Sorek et al. | 382/260 |
| 7,557,832 B2 * | 7/2009 | Lindenstruth et al. | 348/208.4 |
| 2004/0130680 A1 | 7/2004 | Zhou et al. | |
| 2005/0135698 A1 * | 6/2005 | Yatsenko et al. | 382/260 |
| 2007/0127574 A1 * | 6/2007 | Yao et al. | 375/240.16 |
| 2007/0248166 A1 * | 10/2007 | Chen et al. | 375/240.16 |
| 2007/0258707 A1 | 11/2007 | Raskar | |
| 2009/0161756 A1 * | 6/2009 | Lin | 348/294 |

OTHER PUBLICATIONS

"Image Stabalization and Enhancement", http://www.usc.edu/dept/LAS/CAMS/Stabalization.htm.
Morimoto, Carlos et al., "Evaluation of Image Stabilization Algorithms", IEEE, 1998, pp. 2789-2792.

\* cited by examiner

Primary Examiner — Nhan T Tran (57) ABSTRACT

A method and apparatus for image stabilization while mitigating the amplification of image noise by using a motion adaptive system employing spatial and temporal filtering of pixel signals from multiple captured frames of a scene.

19 Claims, 7 Drawing Sheets

METHOD AND APPARATUS FOR IMAGE STABILIZATION USING MULTIPLE IMAGE CAPTURES

Embodiments disclosed herein relate to the stabilization of images captured by a solid state camera.

BACKGROUND

Camera motion or motion of an object in a scene being captured by a solid state imager camera causes motion blur in captured images, especially in low light conditions where exposure time is typically longer than the exposure time for midlevel light conditions. Image stabilization techniques are known and try to address this problem by forcing the camera to operate at a shorter exposure time e.g., a shorter effective shutter speed, for a given scene. With a shorter exposure time, most motion blur can be mitigated or entirely eliminated, producing a relatively motion-blur free captured image.

When the exposure time is shortened, however, the gain applied to the pixel signals of the captured image must be amplified to obtain the same exposure needed to capture the scene. This undesirably amplifies any noise already present in the captured image. Thus, a method and apparatus for stabilizing an image while mitigating noise is desirable.

DETAILED DESCRIPTION OF THE INVENTION

Method and apparatus embodiments described herein provide image stabilization to reduce motion blur while mitigating the amplification of image noise by using a motion-adaptive system employing spatial and temporal filtering of pixel signals from multiple captured frames of a scene. In the embodiments described herein, several frames, each with relatively short exposure times that effectively equal the total exposure time for an imaged scene, are successively captured and filtered to produce an output image. As explained below in more detail, by using a recursive process, only one additional image buffer is needed for the processing, even though multiple images are captured.

Figure 1:
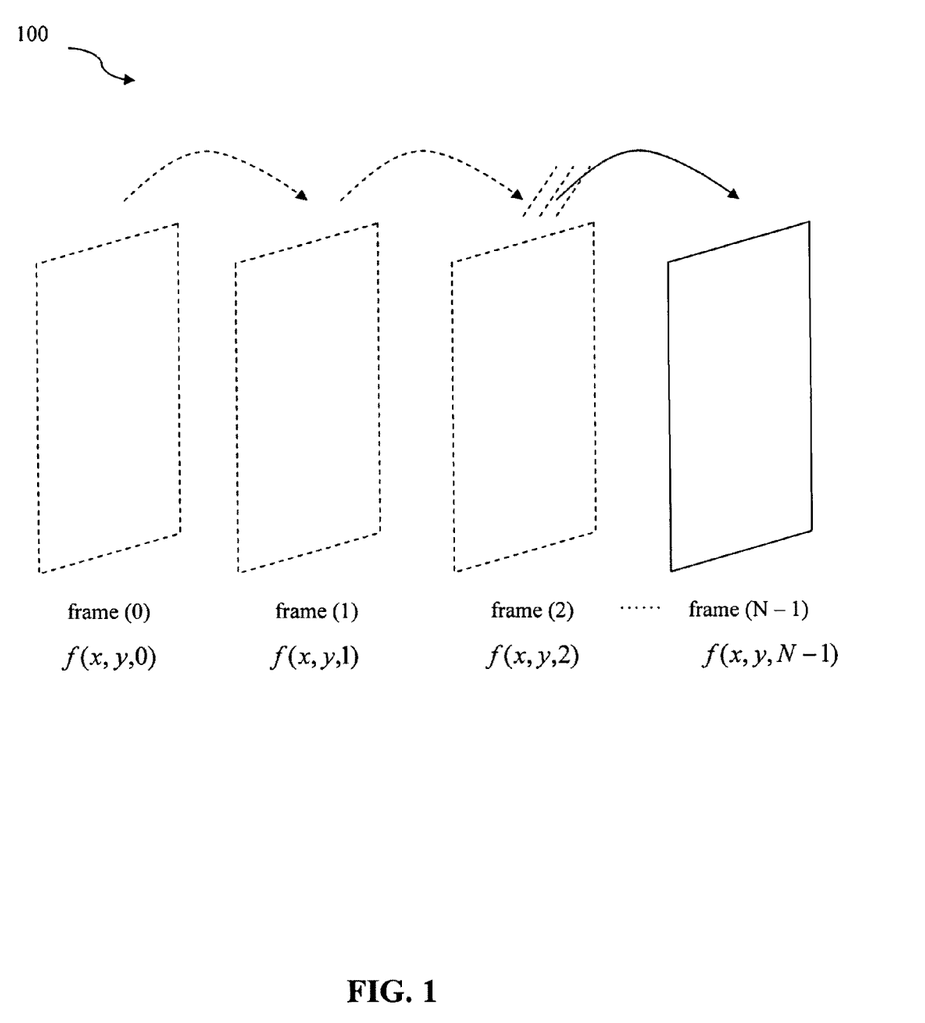
FIG. 1 depicts the capture of a sequence of image frames of a scene.

FIG. 1 depicts the capture and processing of a sequence 100 of image frames of a scene. Sequence 100 includes frames (0) through (N−1) captured over the total integration (i.e. exposure) time T, with N being equal to the total number of frames captured in the scene. The total integration time T is the integration time normally used to capture an image under the present conditions in a single frame, typically determined by an automatic exposure function of a camera. In the described embodiment, the successive frames, denoted as $f(x,y,k)$ for $0 \leq k \leq N-1$, are each captured with a fraction of the total integration time T. For example, if the exposure time for capturing an image in a single frame under current conditions would typically be 200 ms, and N is equal to 4, the exposure time for capturing each frame in sequence 100 may be T/N, or 50 ms. While the example above describes uniform exposure times for each frame of the sequence 100, it should be appreciated that the exposure times may not necessarily be uniform. It should also be appreciated that, while N may typically be equal to four or six, any number N of frames may be appropriate for performing an embodiment described herein.

Figure 2:
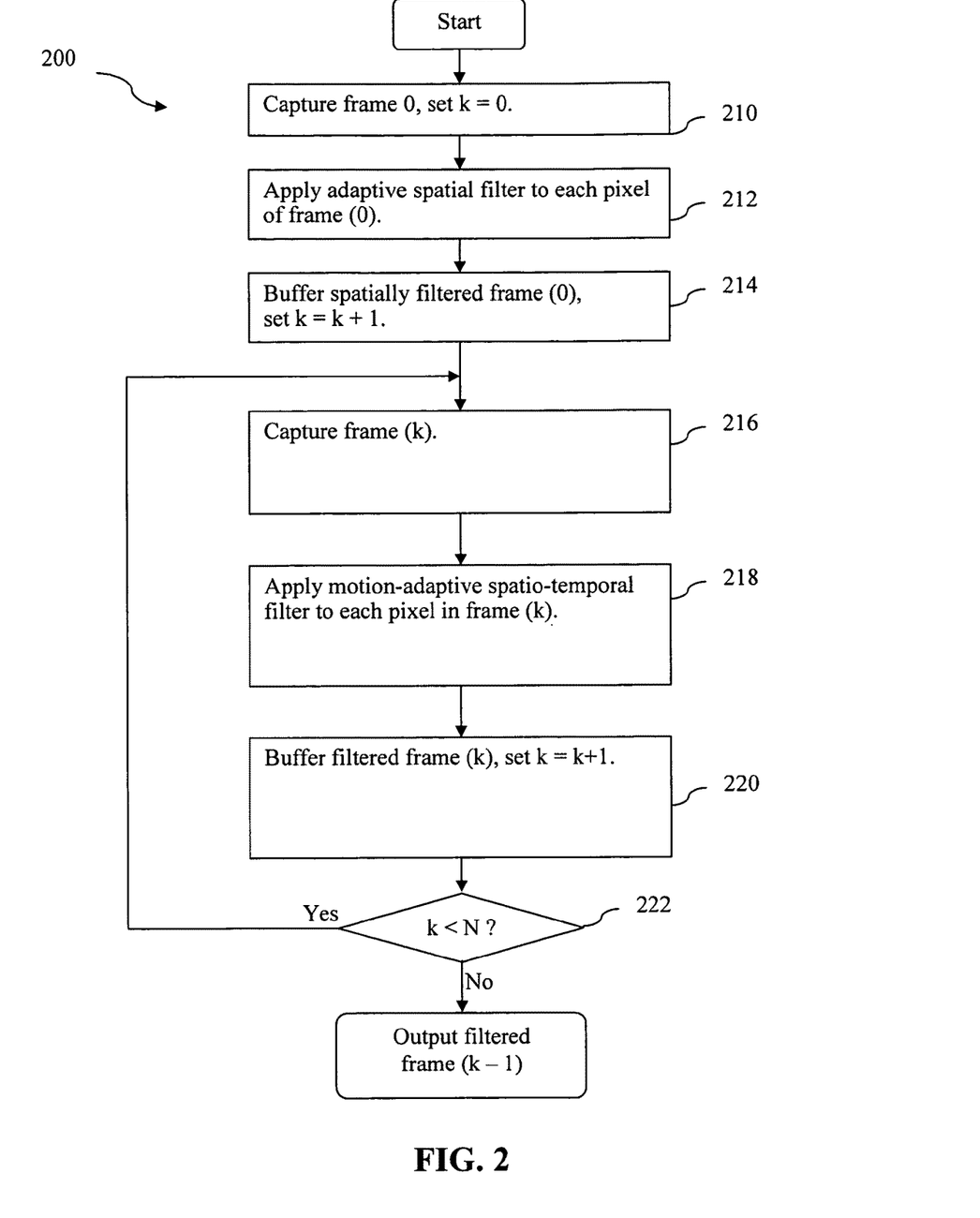
FIG. 2 is a flowchart representing the image processing employed in an embodiment described herein.

FIG. 2 is a flowchart representing the image processing method 200 employed in an embodiment described herein. As is described below in more detail, the method 200 includes the capture of a sequence (e.g., sequence 100) of N frames of an image, each with a respective exposure time of T/N, T being the exposure time typically determined as appropriate for capturing an image in a single frame under the current conditions. Frames (0) through (N−1) in the sequence will be denoted herein as $f(x,y,k)$ for $0 \leq k \leq N-1$.

The method 200 begins at step 210, where a counter k is set to 0. The first frame of the sequence, designated as frame 0 and denoted by the function $f(x,y,0)$, is captured at this step also.

At step 212, each pixel of frame 0 is spatially filtered. The spatial filtering may be accomplished using an adaptive spatial filter, as described below. Spatial filtering is applied to each pixel of frame 0. At step 214, the spatially filtered frame 0 (e.g., $\tilde{f}(x,y,0)$) is stored in an image buffer, and the counter k is incremented by one (i.e. k=k+1).

At step 216, the next frame in the sequence, frame (k), is captured, using exposure time T/N. At step 218, motion-adaptive spatio-temporal filtering is applied to each pixel of frame (k). Motion-adaptive spatio-temporal filtering, as further described below, applies a weighted combination of spatial filtering and temporal filtering to the frames of an image (e.g. $f(x,y,k)$), depending upon the motion detected between the captured frame (e.g. $f(x,y,k)$) and the previous filtered frame (e.g. $\tilde{f}(x,y,k-1)$). In images having minimal levels of motion, temporal filtering is desirable; in images having maximal levels of motion, spatial filtering is desirable. Because motion may be present in certain areas of the captured image $f(x,y,0 \rightarrow N)$, the motion-adaptive spatio-temporal filtering can be dependent upon motion detected for each pixel in each frame $f(x,y,k)$.

At step 220, the output $f_{out}(x,y,k)$ of the filtered frame $f(x,y,k)$ is stored in the image buffer, replacing the previously filtered and stored frame $\tilde{f}(x,y,k-1)$. During the processing of all captured frames, past processed frames do not need to be saved, as only the most recent processed frame needs to be saved in an image buffer. The counter k is also incremented at step 220. At step 222, if the counter k is less than the total number of frames N, steps 216 through 222 are repeated. The method 200 is completed when k=N, and the final filtered frame in the recursive process, $f_{out}(x,y,N-1)$, is output.

Figure 3:
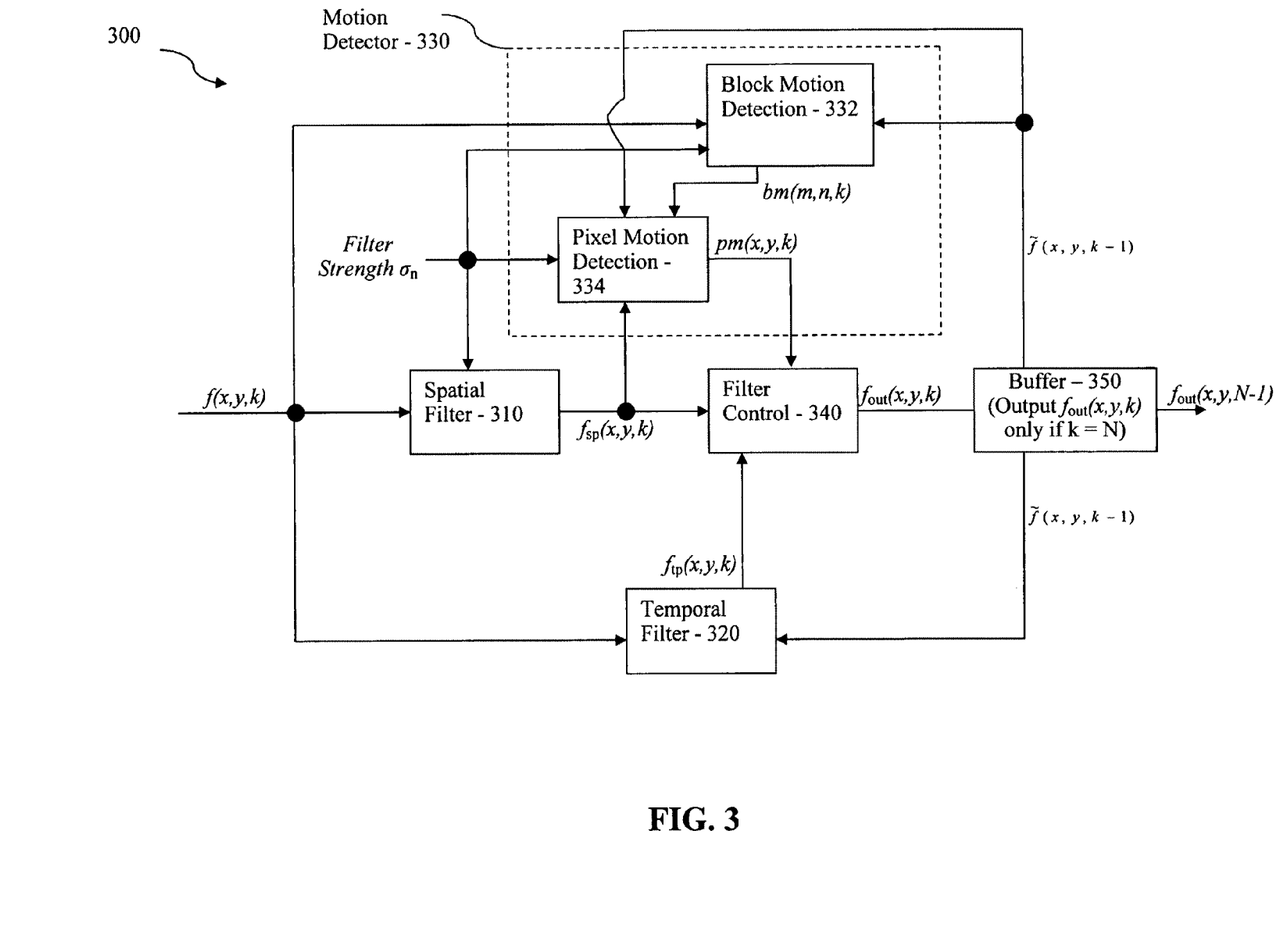
FIG. 3 is a block diagram showing the processing employed in an embodiment described herein.

FIG. 3 is a functional block diagram of the filtering process of a motion-adaptive spatio-temporal filter 300 that can be used at step 218 of method 200 (FIG. 2). The input to filter 300 is the current frame $f(x,y,k)$, with k representing the number of the current frame, beginning with frame $f(x,y,0)$, for $0 \leq k \leq N-1$.

Additionally, motion-adaptive spatio-temporal filter 300 receives a filter strength variable $\sigma_n$. The filter strength variable $\sigma_n$ is related to the noise present in the captured image. In one embodiment, the filter strength variable $\sigma_n$ may be set to depend on characteristics such as, for example, sensor determinations, exposure time, or the gain applied to the image, or may be some combination thereof.

The motion-adaptive spatio-temporal filter 300 includes a spatial filter 310, a temporal filter 320, and a motion detector 330. The motion detector 330 includes a block motion unit 332 and a pixel motion unit 334. The outputs of the spatial filter 310 (i.e., $f_{sp}(x,y,k)$) and the temporal filter 320 (i.e., $f_{tp}(x,y,k)$) are combined by a filter control function 340 to produce the filtered current frame output $f_{out}(x,y,k)$. The filter control function 340 combines the outputs of the spatial filter 310 and temporal filter 320 as a weighted function corresponding to the result of the motion detector 330 (i.e., pm(x,y,k)). For all iterations of the recursive filtering other than the final one, the current frame output $f_{out}(x,y,k)$ is stored in the buffer 350, and fed back to the motion detector 330 and the temporal filter 320 as a previously filtered frame $\tilde{f}(x,y,k-1)$ during the processing of a successive, current frame $f(x,y,k)$. The performance of the motion-adaptive spatio-temporal filter 300 is largely determined by the result of the motion detector 330 and the value of the filter strength variable $\sigma_n$.

The filtered current frame output $f_{out}(x,y,k)$ is output by the filter control function 340, which properly combines the spatially filtered current frame signal $f_{sp}(x,y,k)$ and the temporally filtered current frame signal $f_{tp}(x,y,k)$ based upon the result of the motion detector pm(x,y,k) according to the following equation:

$$f_{out}(x,y,k) = (1-pm(x,y,k)) \cdot f_{tp}(x,y,k) + pm(x,y,k) \cdot f_{sp}(x,y,k).$$ Equation 1

In equation 1, the output of the motion detector 330, denoted as pm(x,y,k), has a floating-point value ranging from 0 to 1, with 0 representing no motion and 1 representing motion. Thus, when the motion detector 330 detects a minimal amount of motion (i.e. pm(x,y,k)≈0), the temporal filter 320 dominates the spatio-temporal function of equation 1. When the motion detector 330 detects a maximal level of motion (i.e. pm(x,y,k)≈1), the spatial filter 310 dominates.

In the motion-adaptive spatio-temporal filter 300, adaptive spatial filtering 310 is applied to each pixel in each captured frame $f(x,y,k)$ of the sequence 100 (FIG. 1) to obtain $f_{sp}(x,y,k)$. An example of an algorithm defining an adaptive spatial filter is described below. The adaptive spatial filter described below can also be applied at step 212 of method 200. The adaptive spatial filter 310 adjusts the type and degree of spatial filtering applied to frame $f(x,y,k)$ to correspond to the contours of local image features, thus preserving the sharpness of the image.

The adaptive spatial filter 310 includes spatial filters for the Y, U, and V components of an image using the YUV color model. In the YUV color model, the Y component represents the luminance of the image. The U and V components represent the chrominance of the image.

For simplicity purposes, in the equations described herein regarding the spatial filter 310, frame $f(x,y,k)$ will be expressed as a function $f(x,y)$; recursive analysis is not used in this purely spatial filtering step, and thus parameter k remains constant for the spatial filtering of each frame. Frame $f(x,y)$ has a local mean of $\mu_f(x,y)$ and a variance of $\sigma_{71}^{2}(x,y)$ computed respectively in equations 2 and 3, respectively, below:

$$\mu_f(x, y) = \sum_{x_i, y_i \in W} f(x_i, y_i) / |W|; \text{ and}$$ Equation 2

-continued $$\sigma_f^2(x, y) = \sum_{x_i, y_i \in W} [f(x_i, y_i) - \mu_f(x, y)]^2 / |W|.$$ Equation 3

In equations 2 and 3, W represents a window centered at pixel (x,y), and |W| denotes the window size. W may be, for example, a 3×3 or a 5×5 window, or a window of appropriate size for the spatial filtering described herein.

The adaptive spatial filter 310 filters the image based on local image characteristics and is thus able to avoid excessive blurring in the vicinity of edges and other image details. For the Y (i.e. luminance) component of the input image $f(x,y)$, the adaptive spatial filter employs a shape-adaptive filter 71 $_s^Y(x,y)$ that is essentially a weighted local mean, and can be defined by:

$$f_s^Y(x, y) = \frac{\sum_{x_i, y_i \in W} \varpi(x_i, y_i) \cdot f^Y(x_i, y_i)}{\sum_{x_i, y_i \in W} \varpi(x_i, y_i)};$$ Equation 4 with the weighting function $\overline{\omega}(x_i, y_i)$ being defined as:

$$\varpi(x_i, y_i) = \begin{cases} w_1, & \text{if} |f^Y(x_i, y_i) - f^Y(x, y)| < c_1 \sigma_n \\ w_2, & \text{if } c_1 \sigma_n \le |f^Y(x_i, y_i) - f^Y(x, y)| < c_2 \sigma_n \\ w_3, & \text{if } c_1 \sigma_n \le |f^Y(x_i, y_i) - f^Y(x, y)| < c_3 \sigma_n \\ 0, & \text{otherwise.} \end{cases}$$ Equation 5

In the shape-adaptive filter $f_s^Y(x,y)$, $\sigma_n$ is the filter strength variable of the frame $f(x,y)$. In the weighting function of equation 5, the weighting coefficients $w_1$, $w_2$, and $w_3$ may be, for example, equal to 3, 2, and 1, respectively; $c_1$, $c_2$, and $c_3$ are filter parameters, and may be, for example, equal to 1, 2, and 4, respectively.

Using the functions and parameters described above, an adaptive spatial filter 210 for the Y component of frame $f(x,y)$ can be defined by equation 6:

$$f_{sp}^Y(x, y) = \mu_Y(x, y) + \frac{A \cdot \max(\sigma_Y^2(x, y) - \sigma_n^2, 0)}{A \cdot \max(\sigma_Y^2(x, y) - \sigma_n, 0) + \sigma_n^2} [f_s^Y(x, y) - \mu(x, y)];$$ Equation 6 where $\sigma_n^2$ represents the noise variance, and A is a parameter (preferably, A=4).

As can be seen from equation 6, where the variance $\sigma_Y^2(x,y)$ of the Y component of frame $f(x,y)$ is small (i.e. in non-edge areas of the image captured in the frame), the adaptive spatial filter 210 switches to the mean $\mu_f(x,y)$ for maximal noise reduction; however, where the variance $\sigma_Y^2(x,y)$ is large (i.e. near edge areas of the image), the filter switches to the shape adaptive filter $f_s^Y(x,y)$ to remove noise while preserving edges. Thus, in areas near edges, noise reduction is performed according to a weighted scale. In other words, the shape adaptive filter defined in equation 6 is able to adapt its functioning to the shape of an edge in a window W in order to avoid blurring while also preserving edges.

The spatial filter 210 is adaptive around areas of high image variance (e.g., edges), and hence is appropriate for filtering the Y component (i.e. the luminance) of an image $f(x,y)$. In one embodiment, the adaptive spatial filter described above by equation 6 is applied to the Y, U, and V components of each frame. Although equation 6 may also be used to filter the U and V color components of the image $f(x,y)$, a simplified filter, described below, may be used instead when filtering U and V components.

The adaptive spatial filter for filtering the U component can be defined by equation 7:

$$f_{sp}^{U}(x,y)=(1-\beta(x,y))\cdot \mu_U(x,y)+\beta(x,y)\cdot f^U(x,y);  \quad \text{Equation 7:}$$

where the function $\beta(x,y)$ is as defined in equation 8:

$$\beta(x,y) = \frac{\min(T_2 - T_1, \max(\sigma_U^2(x,y) - T_1, 0))}{T_2 - T_1}. \quad \text{Equation 8}$$

In equation 7, $f^U(x,y)$ is the U component of the input image, $\mu_U(x,y)$ is the local mean of the U component, and $\sigma_U^2(x,y)$ is the local variance of the U component. The variables $T_1$ and $T_2$ are defined as $T_1=(a_1\sigma_n)^2$ and $T_2=(a_2\sigma_n)^2$. In one implementation, $a_1=1$ and $a_2=3$. Thus, in areas where the U component of the input image $f^U(x,y)$ has a low variance (i.e., the local U variance $\sigma_U^2(x,y)$ is less than $T_1$), the adaptive spatial U filter $f_{sp}^{U}(x,y)$ approaches the value of $\mu_U(x,y)$ (maximum filtering). In areas where the U component of the input image $f^U(x,y)$ has a high variance (i.e., the local U variance $\sigma_U^2(x,y)$ is greater than $T_2$), the adaptive spatial U filter $f_{sp}^{U}(x,y)$ approaches the value of $f^U(x,y)$ (no filtering). For values of the U component of the input image $f^U(x,y)$ with a variance in between the $T_1$ and $T_2$ values, the amount of filtering (i.e., the strength of the $\mu_U(x,y)$ component of equation 7) varies linearly.

Similarly, the V component $f^V(x,y)$ of the input image can be spatially filtered using equation 9:

$$f_{sp}^{V}(x,y)=(1-\beta(x,y))\cdot \mu_V(x,y)+\beta(x,y)\cdot f^V(x,y); \quad \text{Equation 9:}$$

where the function $\beta(x,y)$ is as defined in equation 10:

$$\beta(x,y) = \frac{\min(T_2 - T_1, \max(\sigma_V^2(x,y) - T_1, 0))}{T_2 - T_1}; \quad \text{Equation 10}$$

and $\mu_V(x,y)$ is the local mean of the V component, while $\sigma_V^2(x,y)$ is the local variance of the V component. The variables $T_1$ and $T_2$ are defined similar as for the U component.

Using equations 6, 7, and 9, the Y, U and V components of the frame $f(x,y,k)$ may be spatially filtered while avoiding edge-blurring yet still removing noise from high-variance areas (e.g., edge areas). The spatially filtered frame is output as $f_{sp}(x,y,k)$.

It should be appreciated that other spatial filters may be used in the adaptive spatial filter 310 and at step 212 of method 200. Accordingly, embodiments described herein are not limited to those using the above-described adaptive spatial filter.

An example of a temporal filter that can be utilized in the motion-adaptive spatio-temporal filter 300 is now described. Temporal filtering is applied to each pixel in the current input frame $f(x,y,k)$, and can be defined by a recursive function that results in a weighted averaging of each pixel of the current captured frame of the sequence 100 (FIG. 1) with the corresponding pixel from the previously captured and filtered frame, to obtain $f_{tp}(x,y,k)$.

The temporal filter 320 can be defined by a recursive weighted equation defined as follows:

$$f_{tp}(x,y,k)=\Gamma\cdot f(x,y,k)+(1-\Gamma)\cdot \tilde{f}(x,y,k-1); \quad \text{Equation 11:}$$

where $f(x,y,k)$ is the current frame, $\tilde{f}(x,y,k-1)$ is the filtered previous frame, and $\Gamma$ and $(1-\Gamma)$ are filter weights. In one example implementation, $\Gamma$ may be equal to ⅓; in this implementation, the temporal filter output $f_{tp}(x,y,k)$ is a weighted combination of the current frame $f(x,y,k)$ and the filtered previous frame $\tilde{f}(x,y,k-1)$, with more emphasis being placed on the filtered previous frame $\tilde{f}(x,y,k-1)$. The temporal filter of equation 11 is applied to each of the Y, U, and V components of the image.

It should be appreciated that any temporal filtering algorithm may be used for the temporal filter 320. Accordingly, embodiments of the invention are not limited to those using the algorithm of equation 11.

As defined in equation 1, the motion-adaptive spatio-temporal filter 300 combines the result of the adaptive spatial filter 310 and the result of the temporal filter 320 in a weighted function, the weighting being dependent upon the amount of motion present in the captured image as detected by the motion detector 330.

The motion detector 330 of the motion-adaptive spatio-temporal filter 300 may include two elements: a block motion detector 332 and a pixel motion detector 334. Block motion detection is useful in detecting object motion; pixel motion detection, on the other hand, can eliminate outliers in block motion detection, which may be caused by noise. In filter 300, the output of the block motion detector 332 (i.e., bm(m,n,k)) is input into the pixel motion detector 334. The output of the pixel motion detector 334 (i.e., pm(x,y,k)) is then input into the filter control 340 and used to determine the relative weighting of $f_{sp}(x,y,k)$ and $f_{tp}(x,y,k)$ in $f_{out}(x,y,k)$.

As shown in FIG. 3, block motion detector 332 utilizes the current frame $f(x,y,k)$ and the filtered previous frame $\tilde{f}(x,y,k-1)$. Block motion detector 332 also receives the filter strength variable $\sigma_n$. An example of a method for determining the amount of block motion bm(m,n,k) of the current frame $f(x,y,k)$ is described below.

To detect block motion, the frame is divided into pixel blocks B(m,n). For example, in one embodiment, the frame is divided into pixel blocks that each include 64 pixels (using an 8×8 grid). Each block can be defined by the pixel location (m,n) at the top left corner of the block.

For each block B(m,n), a block motion indicator bm(m,n,k) is determined. Block motion detection 322 is performed using only the Y component of the current frame $f(x,y,k)$. The floating point value of each block motion indicator bm(m,n,k) ranges from 0 to 1. A block motion indicator value of 0 means minimal motion; a block motion indicator value of 1 means maximal motion.

In a first step of block motion detection 322 for a block B(m,n), the mean absolute difference ("mad") $mad_B(m,n,k)$ for the block B(m,n) is computed as follows in equation 12:

$$mad_B(m,n,k) = \sum_{i,j \in B(m,n)} \frac{|f(i,j,k) - \tilde{f}(i,j,k-1)|}{|b \times b|}; \quad \text{Equation 12}$$

where (i,j) are the pixel locations within block B(m,n), and |b×b| is the size of the block B(m,n). The absolute difference used in equation 12 is the difference between the value of each pixel in the current frame and the filtered previous frame, and indicates the total amount of motion in block B(m,n). If motion has occurred, there will be differences in the pixel values from frame to frame. The mean absolute difference $mad_B(m,n,k)$ is then used to determine an initial block motion indicator $bm_0(m,n,k)$ for each block $B(m,n)$, as calculated below in equation 13:

$$bm_0(m, n, k) = \frac{\min(t_2 - t_1, \max(mad_B(m, n, k) - t_1, 0))}{t_2 - t_1}. \quad \text{Equation 13}$$

In equation 13, the variables $t_1$ and $t_2$ are defined as $t_1=(\alpha_1\sigma_n)$ and $t_2=(\alpha_2\sigma_n)$, where $\sigma_n$ is the filter strength variable. In one implementation, $\alpha_1=1$ and $\alpha_2=3$.

Figure 4:
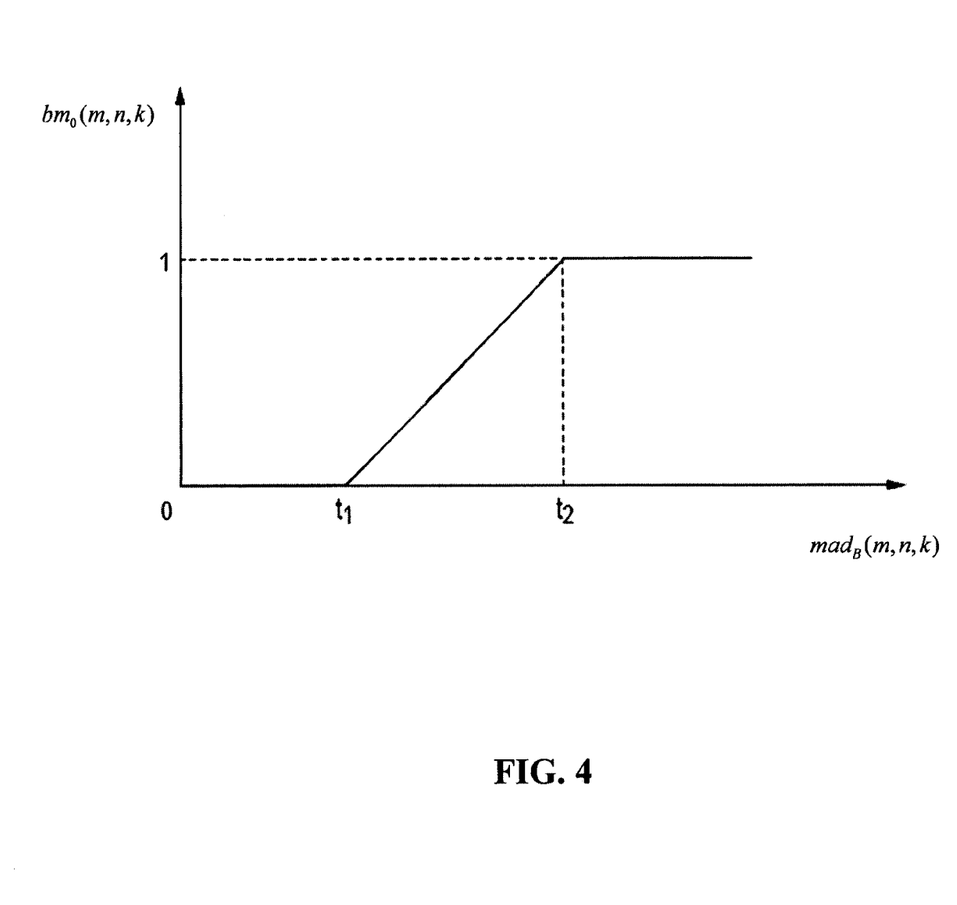
FIG. 4 is a graph useful in explaining operation of a portion of the filtering applied in an embodiment described herein.

FIG. 4 shows a graph of the initial block motion detection function $bm_0(m,n,k)$ of equation 13. As FIG. 4 illustrates, and as can be determined using equations 12 and 13, if a block $B(m,n)$ has little or no motion (i.e., if $mad_B(m,n,k)$ is less than or equal to $t_1$), then the initial block motion indicator $bm_0(m,n,k)$ will have a value equal to zero. If the block $B(m,n)$ has a greater amount of motion (i.e., if $mad_B(m,n,k)$ is greater than or equal to $t_2$), then the initial block motion indicator $bm_0(m,n,k)$ will have a value equal to one. The value of the initial block motion indicator $bm_0(m,n,k)$ ranges between zero and one when $mad_B(m,n,k)$ is greater than $t_1$ but less then $t_2$.

In a second step of block motion detection for block $B(m,n)$, a determination is made regarding whether block motion for block $B(m,n)$ is expected based on the block motion of the same block at a previous frame or neighboring blocks. The determination in this second step is based on the idea that if neighboring blocks have motion, then there is a high possibility that the current block also has motion. Additionally, if the co-located block in the previous frame has motion, there is a higher chance that the current block has motion as well.

The predicted block motion indicator is calculated according to equation 14:

$$bm\_pred(m,n,k)=\max(bm(m,n,k-1),bm(m,n-1,k), bm(m+1,n-1,k),bm(m-1,n,k)). \quad \text{Equation 14:}$$

Figure 5:
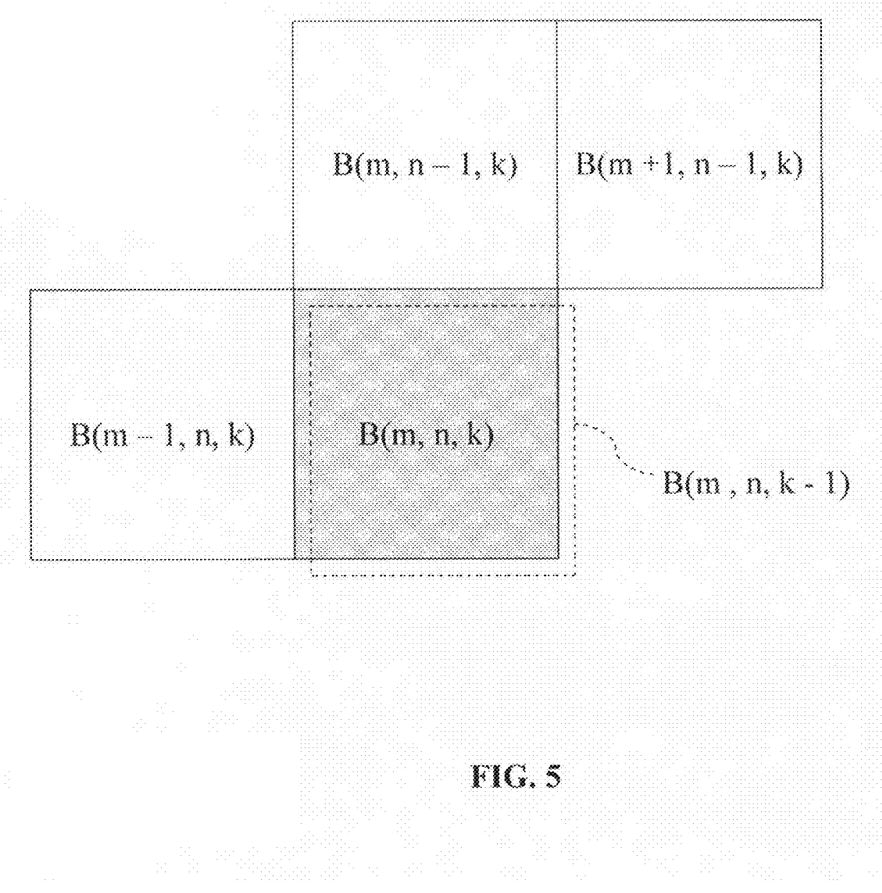
FIG. 5 is a diagram useful in explaining operation of a portion of the filtering applied in an embodiment described herein.

The block motions used in the prediction $bm\_pred(m,n,k)$ include the motion in the co-located block from the previous frame (i.e., $bm(m,n,k-1)$), and the motions in the blocks immediately above (i.e., $bm(m,n-1,k)$), diagonally above and to the right (i.e., $bm(m+1,n-1,k)$), and immediately left (i.e., $bm(m-1,n,k)$) of the current block $B(m,n)$. FIG. 5 illustrates the blocks used to predict whether block $B(m,n)$ is expected to have block motion, with the current block $B(m,n)$ shaded.

A block motion indicator $bm(m,n,k)$ for a block $B(m,n)$ is determined by using the initial block motion indicator $bm_0(m,n,k)$ and the predicted block motion indicator $bm\_pred(m,n,k)$ as defined below in equation 15:

$$bm(m, n, k) = \begin{cases} bm_0(m, n, k), & \text{if } bm_0(m, n, k) > bm\_pred(m, n, k) \\ bm_0(m, n, k) + bm\_pred(m, n, k))/2, & \text{otherwise.} \end{cases} \quad \text{Equation 15}$$

In implementation, the block motion indicator for every block in frame $f(x,y,k)$ may be quantized into 3-bit integer values and stored in a buffer.

Once a block motion indicator $bm(m,n,k)$ has been calculated, the pixel motion indicators $pm(x,y,k)$ for each pixel in the block $B(m,n)$ may be determined by the pixel motion detector 324. Pixel motion is computed for each of the Y, U and V components of the current frame $f(x,y,k)$. For Y components, the pixel motion indicator $pm^Y(x,y,k)$ is determined with reference to the spatially filtered current frame $f_{sp}(x,y,k)$, the filtered previous frame $\tilde{f}(x,y,k-1)$, the block motion indicator $bm(m,n,k)$ for the block in which the pixel is located, and the filter strength variable $\sigma_n$.

First, an initial pixel motion indicator $pm_0(x,y,k)$ is calculated according to equation 16:

$$pm_0(x, y, k) = \frac{\min(s_2 - s_1, \max(diff - s_1, 0))}{s_2 - s_1}; \quad \text{Equation 16}$$

where $s_1$ and $s_2$ are defined as $s_1=\beta_1\sigma_n$ and $s_2=\beta_2\sigma_n$, and $\sigma_n$ is the filter strength variable. In one embodiment, $\beta_1=\frac{1}{2}$ and $\beta_2=1$. The function diff is calculated according to equation 17:

$$diff=|f_{sp}(x,y,k)-\tilde{f}(x,y,k-1)|; \quad \text{Equation 17:}$$

where $f_{sp}(x,y,k)$ is the output of the spatial filter 310 and $\tilde{f}(x,y,k-1)$ is the filtered previous frame.

With the calculated initial pixel motion indicator $pm_0(x,y,k)$, the pixel motion of the Y component can be obtained according to equation 18:

$$pm^Y(x,y,k)=(1-pm_0(x,y,k))\cdot bm(m,n,k)+pm_0(x,y,k); \quad \text{Equation 18:}$$

where $bm(m,n,k)$ is the block motion for the block that contains the pixel $(x,y)$.

For the U component of frame $f(x,y,k)$, the pixel motion $pm^U(x,y,k)$ can be computed using equation 19:

$$pm^U(x, y, k) = \begin{cases} pm^Y(x, y, k), & \text{if } diff^U < t_c \\ 1, & \text{otherwise.} \end{cases} \quad \text{Equation 19}$$

In equation 19, $t_c$ is defined as $t_c=\gamma\sigma_n$, where in an implementation, $\gamma=1$, and $diff^U$ is computed using equation 20:

$$diff^U=|f_{sp}^U(x,y,k)-\tilde{f}^U(x,y,k-1)|. \quad \text{Equation 20:}$$

The pixel motion $pm^V(x,y,k)$ for the V component of $f(x,y,k)$ can be similarly calculated by using equations 21 and 22 below:

$$pm^V(x, y, k) = \begin{cases} pm^Y(x, y, k), & \text{if } diff^V < t_c \\ 1, & \text{otherwise} \end{cases} ; \text{ and} \quad \text{Equation 21}$$

$$diff^V = |f_{sp}^V(x, y, k) - \tilde{f}^V(x, y, k-1)|. \quad \text{Equation 22}$$

With the above-defined spatial filter $f_{sp}(x,y,k)$ and weighted temporal filter $f_{tp}(x,y,k)$, and the computed pixel motion $pm(x,y,k)$, the motion-adaptive spatio-temporal filter 300 can be expressed as previously defined in equation 1, reproduced below:

$$f_{out}(x,y,k)=(1-pm(x,y,k))\cdot f_{tp}(x,y,k)+pm(x,y,k)\cdot f_{sp}(x,y,k). \quad \text{Equation 1:}$$

In practice, the output $f_{out}(x,y,k)$ is calculated for each of the three image components, Y, U and V. Thus, equation 1 in practice represents the combination of the following three equations:

$$f_{out}^Y(x,y,k)=(1-pm^Y(x,y,k))\cdot f_{tp}^Y(x,y,k)+pm^Y(x,y,k)\cdot f_{sp}^Y(x,y,k); \quad \text{Equation 23}$$

$$f_{out}^U(x,y,k)=(1-pm^U(x,y,k))\cdot f_{tp}^U(x,y,k)+pm^U(x,y,k)\cdot f_{sp}^U(x,y,k); \quad \text{Equation 24:}$$

and $$f_{out}^V(x,y,k)=(1-pm^V(x,y,k))\cdot f_{tp}^V(x,y,k)+pm^V(x,y,k)\cdot f_{sp}^V(x,y,k).$$ Equation 25:

Embodiments of method 200, such as those described above, allow for the capture of an image using multiple frames, each with short exposure times, for image stabilization purposes, while reducing the noise resulting from the increased gain necessary to capture the frames. Embodiments of method 200 provide filtering of the resulting noise that adaptively weights temporal and spatial properties, dependent upon the exposure conditions and the motion present in the captured scene. While embodiments of method 200 allow for recursive filtering, only a single previously-filtered frame need be buffered at any given time during the method 200.

It should be understood that the above-described embodiments are examples. The spatial filter 310 of the motion adaptive spatio-temporal filter 300, as well as the spatial filtering applied in step 212 of method 200 (FIG. 2), can utilize a spatial filter defined according to any algorithm appropriate for spatially filtering an image frame. The temporal filter 320 and the motion detector 330 can also be implemented using any appropriate respective filters. The buffer 350 may also be implemented as part of the block motion detector 330 and temporal filter 320. Accordingly, embodiments of method 200 are not limited to those described above.

Figure 6:
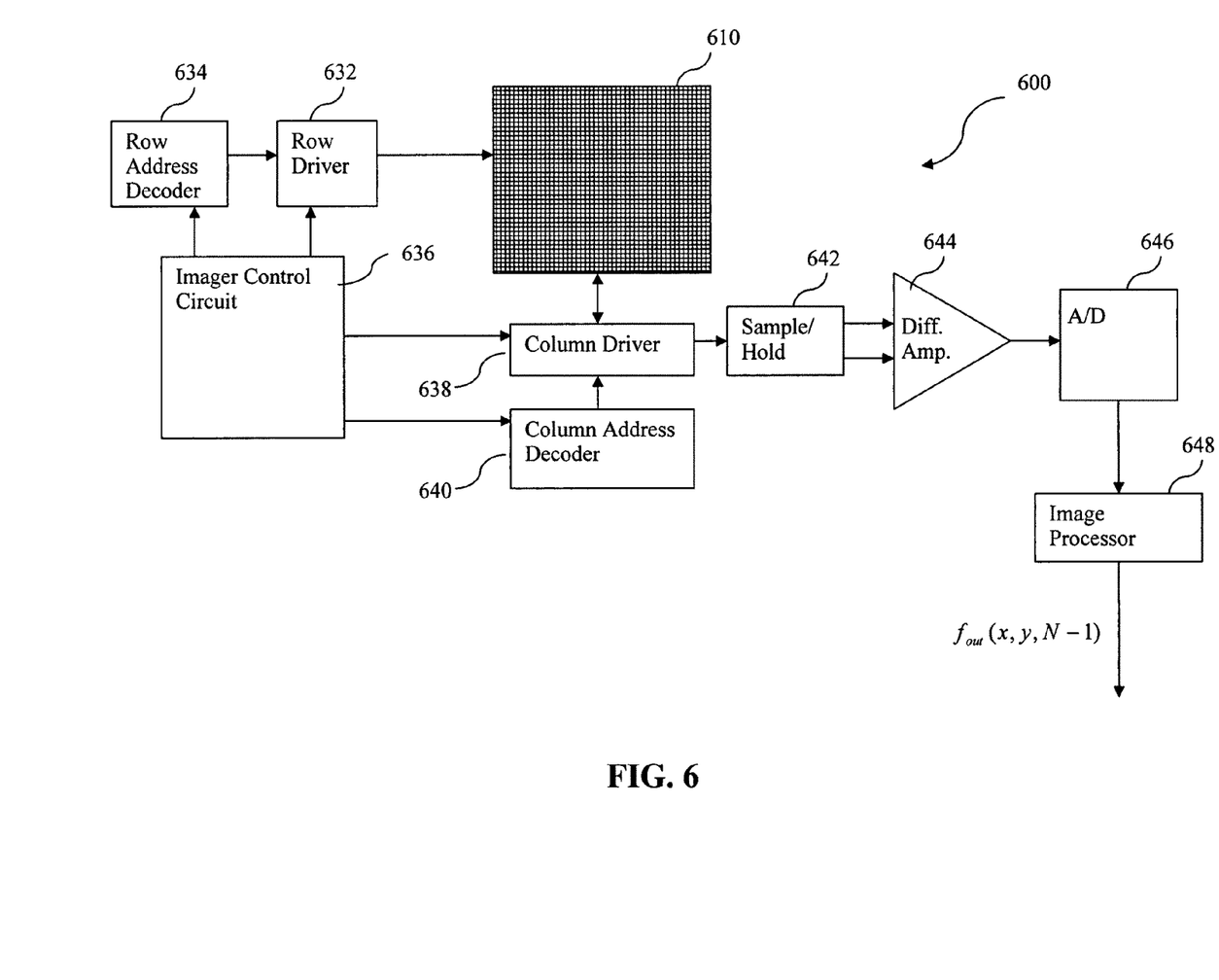
FIG. 6 is a block diagram of an imager device which may employ an embodiment described herein.

Method 200 may be implemented using either hardware or software or via a combination of hardware and software. For example, in a semiconductor CMOS imager 600, as illustrated in FIG. 6, the method 200 may be implemented within a hardware implemented image processor 648. FIG. 6 illustrates a simplified block diagram of a semiconductor CMOS imager 600 having a pixel array 610 including a plurality of pixel cells arranged in a predetermined number of columns and rows. Each pixel cell is configured to receive incident photons and to convert the incident photons into electrical signals. Pixel cells of pixel array 610 are output row-by-row as activated by a row driver 632 in response to a row address decoder 634. Column driver 638 and column address decoder 640 are also used to selectively activate individual pixel columns. An imager control circuit 636 controls address decoders 634, 640 for selecting the appropriate row and column lines for pixel readout. The control circuit 636 also controls the row and column driver circuitry 632, 638 such that driving voltages may be applied.

For implementing method 200, the imager control circuit 636 triggers the pixel array 610, via the row and column decoders 634, 640 and row and column drivers 632, 638, to capture a sequence of multiple frames of an image, each frame having an exposure time that is a fraction of a predetermined exposure time for capturing the scene. The predetermined exposure time may depend on factors such as light level and user-input parameters.

For each frame captured, each pixel cell generally outputs both a pixel reset signal $v_{rst}$ and a pixel image signal $v_{sig}$, which are read by a sample and hold circuit 642 according to a sampling scheme, for example, a correlated double sampling ("CDS") scheme. The pixel reset signal $v_{rst}$ represents a reset state of a pixel cell. The pixel image signal $v_{sig}$ represents the amount of charge generated by the photosensor in the pixel cell in response to applied light during an integration period. The pixel reset and image signals $v_{rst}$, $v_{sig}$ are sampled, held and amplified by the sample and hold circuit 642.

The sample and hold circuit 642 outputs amplified pixel reset and image signals $V_{rst}$, $V_{sig}$. The difference between $V_{sig}$ and $V_{rst}$ represents the actual pixel cell output with common-mode noise eliminated. The differential signal (e.g., $V_{rst}-V_{sig}$) is produced by differential amplifier 644 for each read-out pixel cell. The differential signals are digitized by an analog-to-digital (A/D) converter 646.

The analog-to-digital converter 646 supplies the digitized pixel signals to the image processor 648, which forms and outputs a digital image from the pixel values. In the illustrated embodiment, method 200 may be implemented as part of the image processor 648, in accordance with the filtering examples described above. In another embodiment, method 200 may be implemented before the signals are supplied to the image processor 648. In yet another embodiment, the method 200 may be implemented after the image processor 648, and applied to the data provided by the image processor 648. Method 200 also may be implemented as part of a stand-alone image processor, e.g., a programmed integrated circuit or a personal computer.

In the illustrated embodiment, the image processor 648 outputs a digital image that is the filtered image resulting from the final frame N of sequence 100. The method 200 may also be implemented separate from the image processor 648, performing the recursive filtering on the frames of the image before arrival at the image processor 648.

The method 200 of FIG. 2 may be used in any system which employs a moving image or video imager device, including, but not limited to a computer system, camera system, scanner, machine vision, vehicle navigation, video-phone, surveillance system, auto focus system, star tracker system, motion detection system, image stabilization system, and other imaging systems. Example digital camera systems in which the invention may be used include video digital cameras, still cameras with video options, cell-phone cameras, handheld personal digital assistant (PDA) cameras, and other types of cameras.

Figure 7:
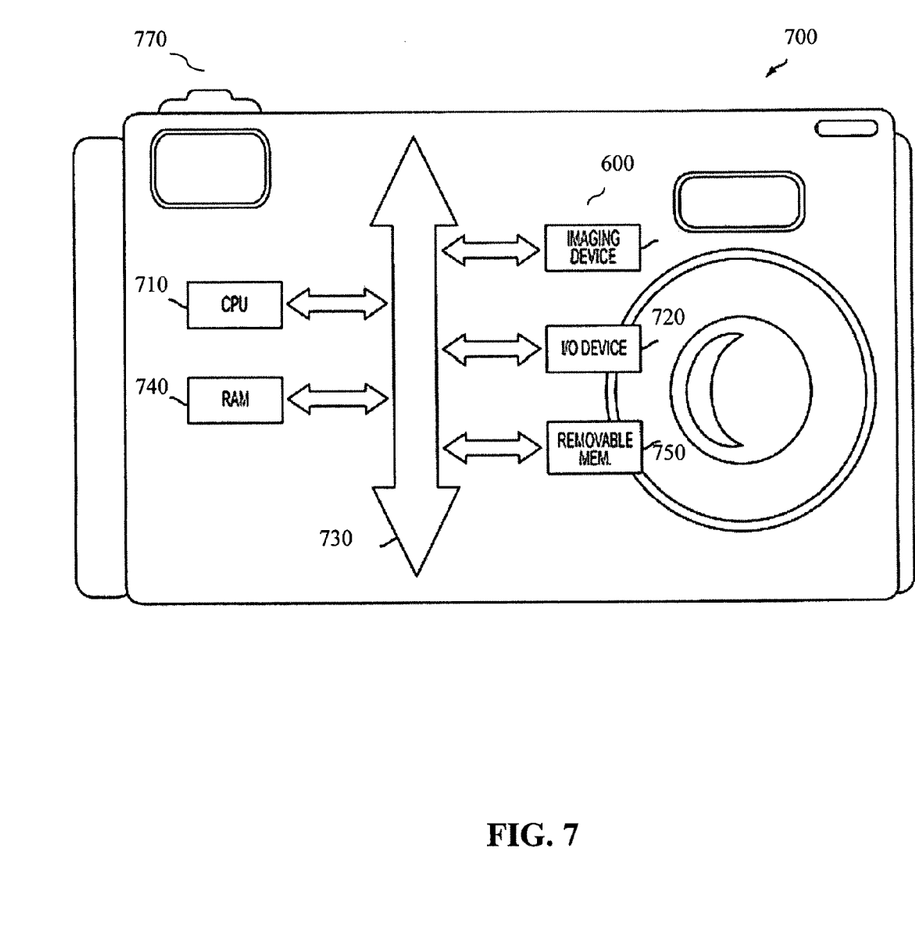
FIG. 7 is a camera system which may employ an imager according to an embodiment described herein.

FIG. 7 shows a typical system 700 in which an imaging device 600 implementing the method 200 of FIG. 2 may be employed; in this example, a digital camera. The system 700 includes an imaging device 600 that includes either software or hardware to implement the method 200 in accordance with the embodiments described above. System 700 also typically may include a processing unit 710, such as a microprocessor, that controls system functions and which communicates with an input/output (I/O) device 720 over a bus 730. Imaging device 600 also communicates with the processing unit 710 over the bus 730. The system 700 of FIG. 7 also includes random access memory (RAM) 740, and can include removable storage memory 750, such as flash memory, which also communicates with the processing unit 710 over the bus 730. Lens 760 focuses an image on a pixel array of the imaging device 600 when shutter release button 770 is pressed.

It should be noted that although the embodiments have been described with specific reference to CMOS imaging devices, they have broader applicability and may be used in any imaging apparatus which generates pixel output values, including charge-coupled devices CCDs and other imaging devices.

What is claimed as new and desired to be protected by Letters Patent of the United States is:

1. A method of image processing for image stabilization, comprising:
    capturing an image of a scene using a plurality of frames, each frame captured using an exposure time that is a fraction of a determined exposure time for the scene;
    spatially filtering pixels in a current one of the captured frames;
    temporally filtering pixels in the current captured frame;

detecting motion of the pixels in the current frame relative to the pixels in a previous, temporarily-stored, filtered frame;

combining results of the spatial and temporal filtering of the current captured frame based on detected motion; and storing the filtered current frame, wherein the motion detecting includes the steps of:

detecting block motion between the current frame and the previous, temporarily-stored, filtered frame; and detecting pixel motion between the current frame and the previously-filtered frame, and wherein:

the current input frame is the defined by a function $f(x,y,k)$;

the spatial filtering of the current input frame produces a result $f_{sp}(x,y,k)$;

the pixel motion detecting of the current input frame produces a result $pm(x,y,k)$;

the temporal filtering of the current input frame produces a result $f_{tp}(x,y,k)$; and the results of the spatial and temporal filtering are combined as a result $f_{out}(x,y,k)$ defined by the equation: $f_{out}(x,y,k)=(1-pm(x,y,k))\cdot f_{tp}(x,y,k)+pm(x,y,k)\cdot f_{sp}(x,y,k)$.

2. The method of claim 1, wherein the previous filtered frame is temporarily stored in a buffer, and the method further comprises:

replacing the previous filtered frame with the filtered current frame.

3. The method of claim 1, wherein the spatial filtering and motion detecting are functions of an input filter strength variable $\sigma_n$, the input filter strength variable $\sigma_n$ relating to the noise in the plurality of frames.

4. The method of claim 3, wherein the input filter strength variable $\sigma_n$ corresponds to sensor characteristics and gain applied to the captured image frame.

5. The method of claim 1, wherein a result of the block motion detection is used in detecting pixel motion.

6. The method of claim 1, wherein the spatial filtering applied is adaptive spatial filtering with an output approaching the local mean value in areas of the current captured image frame having a low variance.

7. A method of image processing for image stabilization, comprising:

capturing an image of a scene using a plurality of frames, wherein each captured frame is captured using an exposure time that is a fraction of a determined exposure time for the scene;

spatially filtering pixels in a first one of the captured frames;

buffering the filtered first captured frame; and for each successive captured frame in the plurality of frames:

spatially filtering each pixel in the captured frame;

temporally filtering each pixel in the captured frame relative to the buffered frame;

detecting motion in the current captured frame relative to the buffered frame;

combining results of the spatial and temporal filtering of the captured frame based on detected motion; and buffering the combined result as a filtered frame, replacing the previous buffered frame, wherein the motion detecting includes the steps of:

detecting block motion between the current frame and buffered frame; and detecting pixel motion between the current frame and the buffered frame, and wherein:

the current input frame is the defined by a function $f(x,y,k)$;

the spatial filtering of the current input frame produces a result $f_{sp}(x,y,k)$;

the pixel motion detecting of the current input frame produces a result $pm(x,y,k)$;

the temporal filtering of the current input frame produces a result $f_{tp}(x,y,k)$; and the results of the spatial and temporal filtering are combined as a result $f_{out}(x,y,k)$ defined by the equation: $f_{out}(x,y,k)=(1-pm(x,y,k))\cdot f_{tp}(x,y,k)+pm(x,y,k)\cdot f_{sp}(x,y,k)$.

8. The method of claim 7, wherein a final filtered frame of the plurality of frames is output.

9. The method of claim 7, wherein the spatial filtering and motion detecting are functions of an input filter strength variable $\sigma_n$, the input filter strength variable $\sigma_n$ relating to the noise in the plurality of frames.

10. The method of claim 7, wherein the input filter strength variable $\sigma_n$ corresponds to sensor characteristics and gain applied to the captured image frame.

11. The method of claim 7, wherein a result of the block motion detection is used in detecting pixel motion.

12. An imager, comprising:

a pixel array that outputs pixel values for a current image frame; and an image processor electrically connected to the pixel array, the image processor including:

a buffer to store a previously filtered image frame;

a spatial filter to filter the current image frame;

a temporal filter to average the current image frame with the previously filtered image frame;

a motion detector to detect motion between the current image frame and the previously filtered image frame; and a controller to combine outputs of the spatial filter and the temporal filter for each pixel of the current image frame in response to the motion detected by the motion detector, wherein the motion detector further comprises:

a block motion detector; and a pixel motion detector, wherein the result of the block motion detector is input to the pixel motion detector, and wherein the current input frame is the defined by a function $f(x,y,k)$, and:

the result of the spatial filter is $f_{sp}(x,y,k)$;

the result of the pixel motion detector is $pm(x,y,k)$;

the result of temporal filter is $f_{tp}(x,y,k)$; and the result of the controller is $f_{out}(x,y,k)$ and is defined by the equation:

$f_{out}(x,y,k)=(1-pm(x,y,k))\cdot f_{tp}(x,y,k)+pm(x,y,k)\cdot f_{sp}(x,y,k)$, wherein a control circuit is electrically connected to the pixel array for controlling the output of pixel values by the pixel array, wherein the control circuit triggers the pixel array to capture an image using a plurality of frames, each frame is captured using an exposure time that is a fraction of a determined exposure time for the scene.

13. The imager of claim 12, wherein the spatial filter and motion detector receive an input filter strength variable $\sigma_n$, the input filter strength variable $\sigma_n$ relating to the noise in the plurality of frames.

14. The imager of claim 13, wherein the input filter strength variable $\sigma_n$ corresponds to sensor characteristics and gain applied to the current image frame.

15. The imager of claim 12, wherein the result of the controller $f_{out}(x,y,k)$ is input into the buffer.

16. An image processor that receives a plurality of image frames of a captured image, the image processor comprising:
- a buffer to store a previously filtered image frame;
- a spatial filter to filter a current image frame;
- a temporal filter to average the current image frame with the previously filtered image frame;
- a motion detector to detect motion between the current image frame and the previously filtered image frame; and
- a controller to combine outputs of the spatial filter and the temporal filter for each pixel of the current image frame in response to the motion detected by the motion detector, wherein the motion detector further comprises:
  - a block motion detector; and
  - a pixel motion detector, wherein the result of the block motion detector is input to the pixel motion detector, and wherein the current input frame is the defined by a function $f(x,y,k)$, and:
- the result of the spatial $f_{sp}(x,y,k)$;
- the result of the pixel motion detector is $pm(x,y,k)$;
- the result of the temporal filter is $f_{tp}(x,y,k)$; and
- the result of the controller is $f_{out}(x,y,k)$ and is defined by the equation:

$$f_{out}(x,y,k) = (1-pm(x,y,k)) \cdot f_{tp}(x,y,k) + pm(x,y,k) \cdot f_{sp}(x,y,k);$$

wherein each of the plurality of image frames is captured using an exposure time that is a fraction of a determined exposure time for the scene.

17. The image processor of claim 16, wherein the spatial filter and motion detector receive an input filter strength variable $\sigma_n$, the input filter strength variable $\sigma_n$ relating to the noise in the plurality of image frames.

18. The image processor of claim 17, wherein the input filter strength variable $\sigma_n$ corresponds to sensor characteristics and gain applied to the current image frame.

19. The image processor of claim 16, wherein the result of the controller $f_{out}(x,y,k)$ is input into the buffer.

\* \* \* \* \*